United States Patent [19]

Sharber

[11] Patent Number: 4,790,090

[45] Date of Patent: Dec. 13, 1988

[54] FISH TAG

[76] Inventor: Norman G. Sharber, P.O. Box 1059, Flagstaff, Ariz. 86002

[21] Appl. No.: 44,989

[22] Filed: Apr. 30, 1987

[51] Int. Cl.⁴ ............................................. G09F 3/00
[52] U.S. Cl. ........................................... 40/300; 119/3
[58] Field of Search ................. 40/300; 128/316, 217, 128/330; 119/3

[56] References Cited

U.S. PATENT DOCUMENTS

| | | | |
|---|---|---|---|
| 1,742,649 | 1/1930 | Eastman | 40/300 |
| 3,150,207 | 9/1964 | Gore | 260/827 |
| 3,315,020 | 4/1967 | Gore | 264/120 |
| 3,369,525 | 2/1968 | Debrotnic et al. | 119/3 |
| 3,545,405 | 12/1970 | Jefferts | 119/3 |
| 3,953,566 | 4/1976 | Gore | 264/288 |
| 3,962,153 | 6/1976 | Gore | 260/2.5 |
| 4,025,679 | 5/1977 | Denny | 428/91 |
| 4,096,227 | 6/1978 | Gore | 264/210 |
| 4,110,392 | 8/1978 | Yamazaki | 264/127 |
| 4,187,390 | 2/1980 | Gore | 174/102 |
| 4,194,041 | 3/1980 | Gore et al. | 428/315 |
| 4,283,448 | 8/1981 | Bowman | 428/36 |
| 4,344,999 | 8/1982 | Gohlke | 428/212 |
| 4,385,093 | 5/1983 | Hubis | 428/316.6 |
| 4,443,511 | 4/1984 | Worden et al. | 428/198 |
| 4,461,529 | 7/1984 | Fariss | 339/102 |
| 4,478,665 | 10/1984 | Hubis | 156/229 |
| 4,482,516 | 11/1984 | Bowman et al. | 264/127 |
| 4,532,316 | 6/1985 | Henn | 528/59 |
| 4,557,957 | 12/1985 | Manniso | 428/36 |
| 4,599,810 | 7/1986 | Sacre | 36/55 |
| 4,672,967 | 6/1987 | Smith | 119/3 |

FOREIGN PATENT DOCUMENTS

| | | | |
|---|---|---|---|
| 1250186 | 9/1967 | Fed. Rep. of Germany | 49/300 |
| 943161 | 3/1949 | France | 40/300 |
| 1111710 | 9/1984 | U.S.S.R. | 40/300 |

OTHER PUBLICATIONS

Exhibit A—"Principles of Fishery Science", W. Everhart et al, no date.
Exhibit B—"Loss of Floy Anchor Tags from Lake Whitefish", M. Ebener and F. Copes, 1/1982, pp. 90–93.
Exhibit C—"Growth and Survival of Largemouth Bass Tagged with Floy Anchor Tags", Tranquilli et al, pp. 184–187, 1/1982.
Exhibit D—"Evaluation of Floy Anchor Tags for Short Term Mark-Recapture Studies with Blueback Herring", J. Bulak, 1/1983.
Exhibit E—"A Small Arterial Substitute: . . . ", C. Campbell et al., Mar. 24, 1975.
Exhibit F—"Expanded Polytetrafluoroethylene (PTFE) A Superior Biocompatible Material for Vascular Prosthesis", D. Goldfarb et al, pp. 1–9, no date.
Exhibit G—"The Gore-Tex Vascular Graft", Technical Bulletin, 1/1987.
Exhibit H—"Tissue Response to Gore-Tex Expanded PTFE Medical Products"; W. L. Gore & Associates, 1/1987.

Primary Examiner—Ira S. Lazarus
Assistant Examiner—D. M. Cox
Attorney, Agent, or Firm—Cahill, Sutton & Thomas

[57] ABSTRACT

An invasive anchor of a fish tag includes an anchor element for initial mechanical attachment and an element of inert material for adherence with the tissue of the fish through cellular growth.

20 Claims, 2 Drawing Sheets

FISH TAG

BACKGROUND OF THE INVENTION

1. Field of the Invention

The present invention relates to fish tags and, more particularly, to fish tags having an invasive cellularly adhering point of attachment.

2. Description of the Prior Art

Fishery scientists have been searching for the ideal fish mark or tag since 1873 when Atlantic salmon were tagged in the Penobscot River, Me., and later recovered in fair numbers. The ability to account for the presence for a particular fish or group of fish in time and space furnishes a basic tool for fishery resource management. Fish tags and marks can be divided generally into categories where the fish is mutilated in some manner, as by removing a fin or part of the maxillary bone, by tagging, which involves the insertion, attachment or injection of a foreign object of substance or natural tags such as parasites or bacterial fauna and kemoprints. Color marks and radioactive tags may be injected or the fish may be emersed in colored or radioactive solutions.

An ideal mark or tag has certain characteristics, which characteristics include: remain unaltered during the lifetime of the fish; have no effect on fish behavior or make the fish more available to predators; not tangle with weeds or nets; be inexpensive and easily obtained; fit any size fish with little alteration; be easy to apply without anesthetic and with little or no stress to the fish; permit enough variation to at least separate groups; create no health hazard; cause no harm to fish as food or to aesthetics; be easy to detect in the field by untrained individuals; cause no confusion in reporting; and remain unaffected by preservation.

In selecting a particular mark or tag, several factors must be considered to assure the success of any large scale tagging program. These factors include: length of time the mark is to remain on the fish; personnel available for applying the mark; species of fish; methods of capture and handling; and interstate or international programs affecting the fish to be marked or tagged.

A number of tags have been developed over the years. Several of these will be described below but it is to be understood that variants of each tag identified also exist. The Archer tag consists of a single plate attached by two wires which wires pierce the tissues and are then twisted or clenched. The Atkins tag consists of a bead or flat plate attached by thread or wire that pierces the tissues to form a loop. The bachelor-button tag consists of two plates held together rigidly by a shaft that pierces the tissues. The barbed tag consists of a straight shaft with or without an attached plate that is pushed into the tissues and that depends for holding wholely upon one or more barbs. The body cavity tag may be any material inserted loosely into the body cavity. The collar tag is a ring of any material attached wholely by encirclement without piercing any tissues. The hook tag is a shaft piercing the tissues and held by the curve of the shaft and one or more barbs. The hydrostatic tag is a tag hollowed so that it's specific gravity is very slightly less than that of water and is attached by a wire piercing the tissues. The internal anchor tag consists of a flexible chain or thread that pierces the body wall and is held in place by being attached to material inside the body cavity. The jaw tag is attached by encirclement of any of the bones of the jaw. The Petersen tag consists of two plates or discs attached loosely together by a wire or a pin that pierces the tissues. The strap tag is a flat metal strip in which one pointed end pierces the tissues and is clenched through a hole in the other end. A modified Carlin tag consists of a plastic pennant attached by a wire link to a double wire through the fish's back. The spaghetti tag is a loop of vinyl tubing attached to the back of the fish. Other means for marking fish include biotelemetry, color marking, radioactive marking, tattooing, branding, fluorescent pigment, tetracycline antibiotics and mutilation.

Generally, mechanically attached invasive tags are relatively easy and quick to apply but generally work loose. Such loss of the tags may be exacerbated through rejection by the flesh in relative contact with the tag. Those tags which are locked about a bone have greater longevity but the loop used is not attachable quickly and easily and it tends to become caught upon weeds, rocks, sticks and similar articles. Deliberate mutilation is not readily recognizable by the general public and has limited value. Marking (such as color, radioactivity, tetracycline) of the fish is generally too sophisticated, if effective, to be recognizable by the general public. For any such marking which does not identify the marking agency, reporting by the general public is generally unavailable.

SUMMARY OF THE INVENTION

The present invention is directed to a fish tag which is initially mechanically locked with the flesh and/or bone(s) of a fish. Shortly after insertion, a portion of the tag becomes assimilated with the flesh of the fish through cellular adhesion, impregnation or ingrowth. Upon such assimilation, the useful life of the tag may be increased to that of the life of the fish.

It is therefore a primary object of the present invention to provide a long term invasively attached tag.

Another objection of the present invention is to provide a tag having an invasive portion which becomes assimilated with the flesh of the specimen through cellular ingrowth.

Yet another object of the present invention is to provide a tag which is initially mechanically attached to a living specimen and subsequently becomes permanently attached through cellular ingrowth.

Still another object of the present invention is to mark a specimen long term with a tag having a part secured to the specimen by cellular ingrowth.

Still another object of the present invention is to mark a living specimen long term with a tag having a part secured to the specimen by adherence of the living flesh to the tag.

A further object of the present invention is to provide a long term tag for a living specimen which is readily attachable by inexperienced personnel.

A yet further object of the present invention is to provide a long term fish tag readily identifiable and reportable by the general public.

A still further object of the present invention is to provide a tag useful for marking any sized fish.

These and other objects of the present invention will become apparent to those skilled in the art as the description thereof precedes.

BRIEF DESCRIPTION OF THE DRAWINGS

The present invention may be described with greater specificity and clarity with reference to the following drawings, in which:

FIG. 5 illustrates assimilation of the present invention with the flesh of a fish;

FIG. 7 illustrates a step in the invasive attachment of the present invention to a fish.

DESCRIPTION OF THE PREFERRED EMBODIMENT

Figure 1:
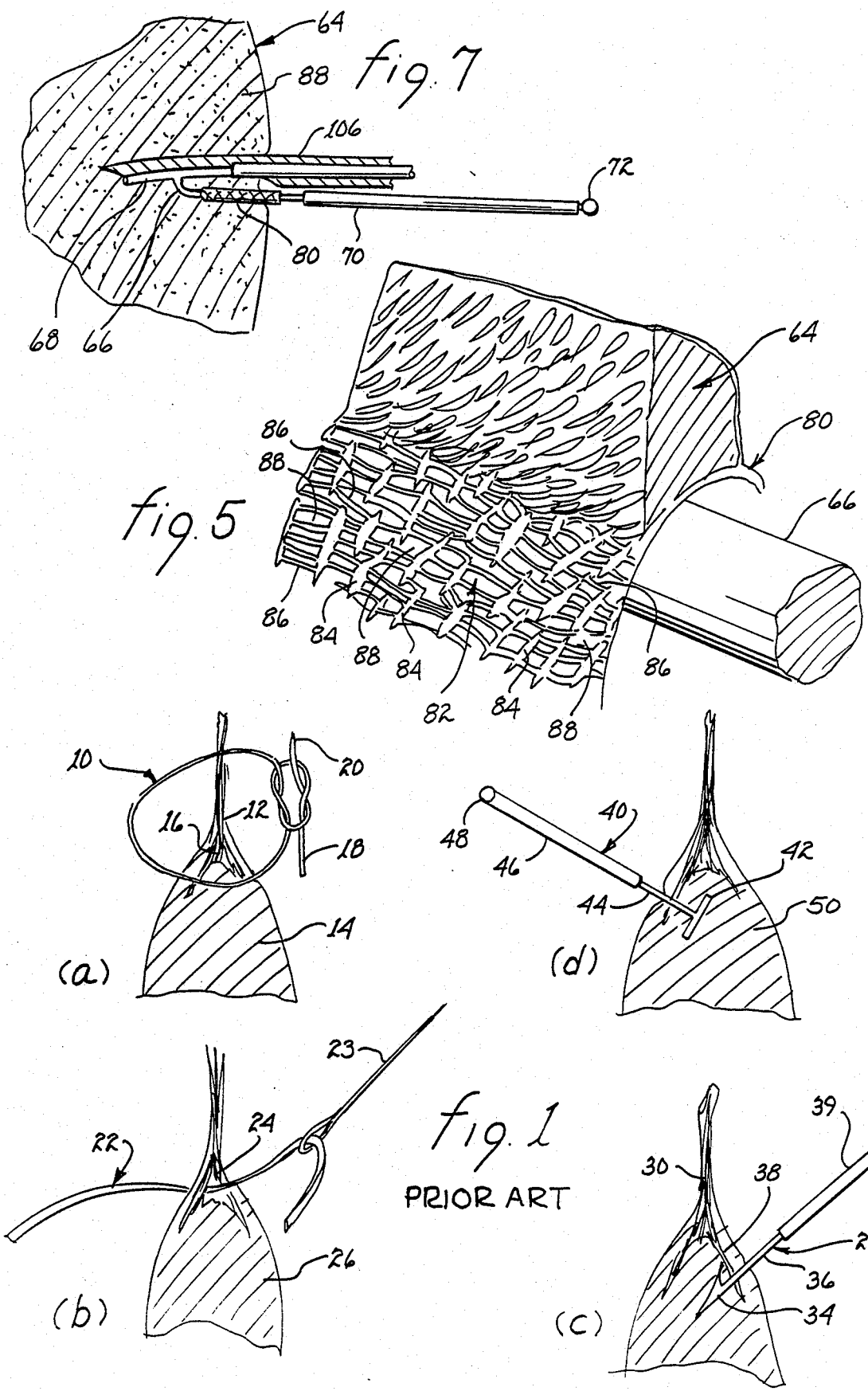
FIGS. 1(a) through 1(d) illustrate four different presently used prior art fish tags.

FIG. 1(a) illustrates a commercially available tag 10 referred to as a spaghetti tag. Tag 10 is applied with a pointed stainless steel applicator at the posterior of dorsal 12 of fish 14 and under backbone 16. Once inserted, the applicator is removed and ends 18, 20 are tied with an overhand knot to leave a loop large enough for anticipated growth. This tag has a certain benefit of permanency but installation in the field requires a high degree of dexterity. The required dexterity is not available when tagging is being performed in cold waters or in cold weather. Furthermore, the amount of time necessary to attach tag 10 subjects the fish to potential trauma. The time factor seriously constrains the number of fish per hour that can be tagged. FIG. 1(b) illustrates a tag 22 which is commercially available and is referred to as a streamer tag. The tag itself is of polyethylene material to prevent rot and deterioration. The tag is threaded by a needle 23 through a hole punched in the maxillary bone 24 of fish 26. As the center portion of the tag is narrower than the end portions, there will be a tendency to restrain the tag from being withdrawn. The requirement to thread and use needle 23 creates an obvious hazard to tagging personnel aside from the delays encountered in having to prepare the tag for insertion. Moreover, the substantial degree of accuracy required is counter productive to rapid tagging. Accordingly, tag 22 has limited value when rapidity of tagging is paramount, when the water is cold or when the temperature is low.

FIG. 1(c) illustrates a presently commercially available tag 28 known as a yellow dart tag. This tag is applied at the posterior of dorsal fin 30 of a fish 32. Barb 34 and associated shaft 36 of tag 28 is forced forwardly into the fish at a 45° angle through the dorsal rays 38. Properly inserted, barb 34 will lock behind the dorsal rays and tubing 39 attached to shaft 36 will stream alongside the fish's body. This tag is highly dependent upon accurate insertion in order to obtain engagement with the dorsal rays. Because barb 34 and shaft 36 are foreign objects, the surrounding tissues will reject and draw away from the barb and shaft which will result in the formation of a surrounding cavity. This is a usual and normal biological phenomena which can result in actual rejection of the foreign object. The essentially continual vibration of the barb and shaft due to the force of water acting upon the downstream portion of the tag will cause the cavity to expand rapidly. The receding flesh adjacent barb 34 will permit withdrawal of the barb. If the barb was initially in physical contact with a dorsal ray, such contact and attendant locking engagement may become terminated due to the continuing and less and less impeded movement of the barb. Thus, the longevity of tag 28 is considered short term.

Figure 6:
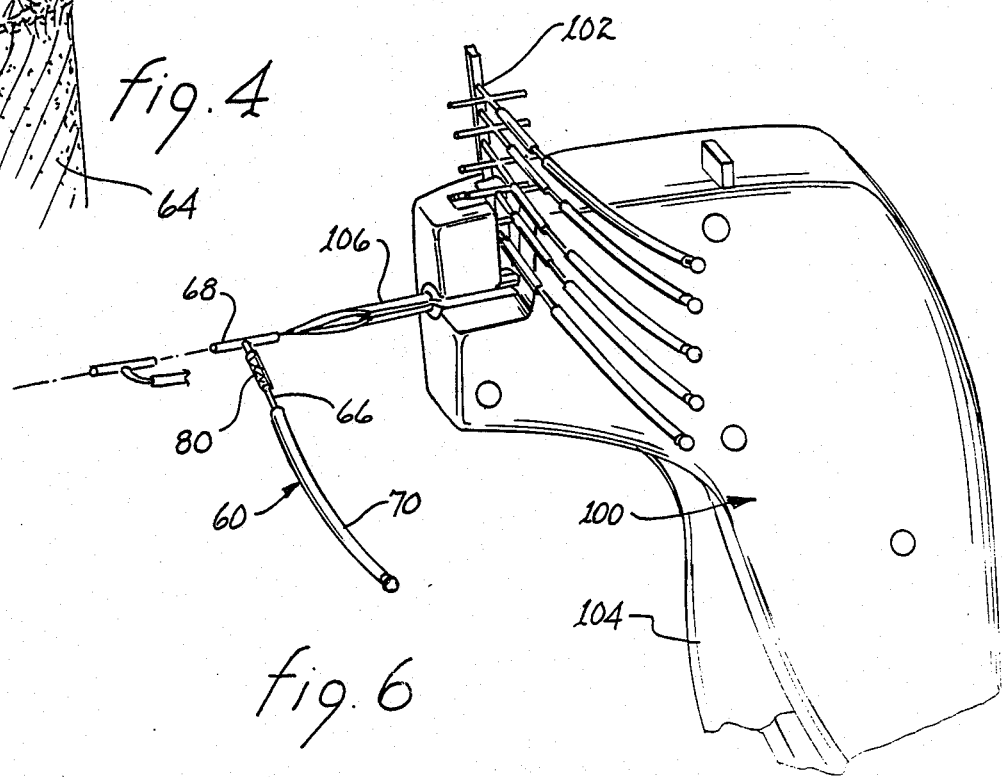
FIG. 6 illustrates a conventional tool for attaching the present invention to a fish.

FIG. 1(d) illustrates a tag 40 which is functionally quite similar to tag 28. A cross member 42 is attached at its midpoint to a shaft 44. The shaft supports a sleeve 46 which contains information pertinent to tagged fish 50. A bulbous terminal end 48 of shaft 44 prevents removal of the sleeve. A gun 100 for insertion of tag 40 is illustrated in FIG. 6. In essence, this tool aligns crosspiece 42 with shaft 44 during insertion by engagement with a slotted hypodermic needle. After withdrawal of the hypodermic needle, crosspiece 42 reorients itself perpendicular to shaft 44. The resulting impediment or anchor prevents withdrawal of tag 40. However, for reasons stated with respect to tag 28 illustrated in FIG. 1(c), recession of the tissues adjacent crosspiece 42 and shaft 44 will accommodate or permit withdrawal of the tag after a period of time.

Figure 2:
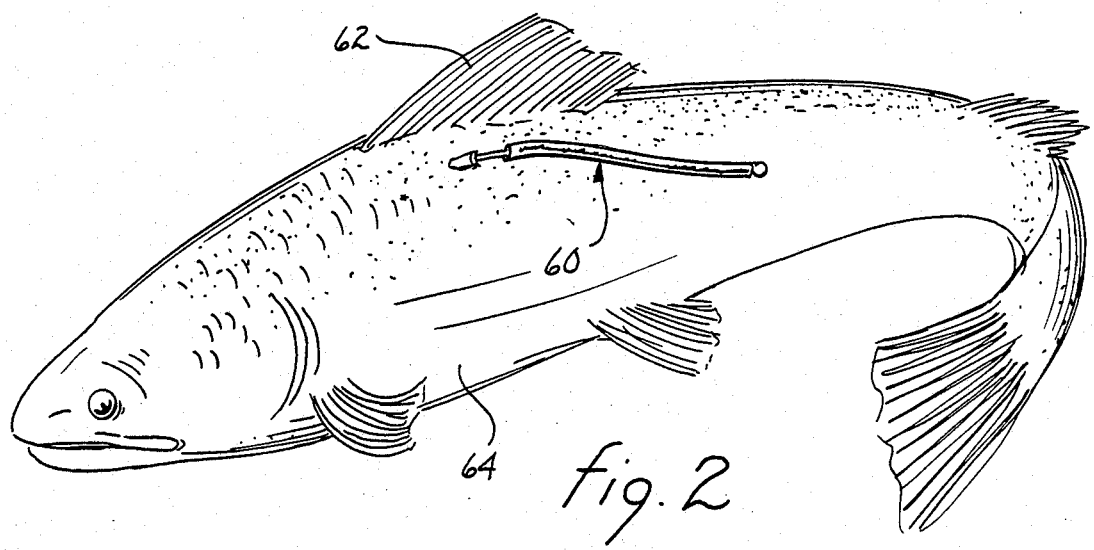
FIG. 2 illustrates the present invention attached to a fish.
Figure 3:
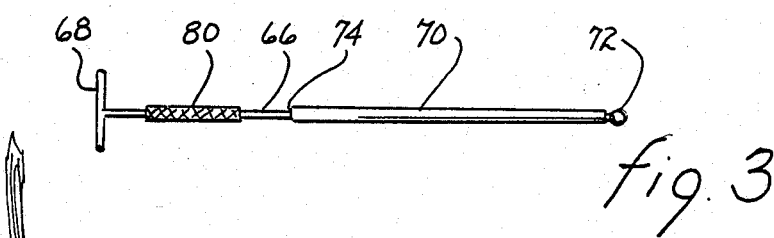
FIG. 3 illustrates a fish tag constructed in accordance with the present invention.
Figure 4:
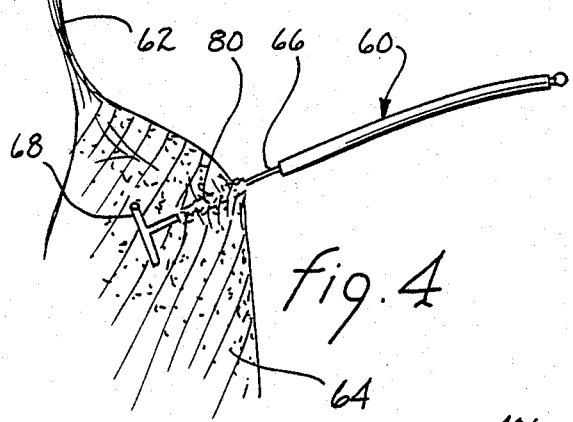
FIG. 4 illustrates attachment of the present invention to a fish.

Referring jointly to FIGS. 2, 3 and 4, a fish tag 60 is illustrated, which is similar in some respect to fish tag 40 illustrated in FIG. 1(d) but modified in accordance with the present invention. The major manufacturer of tag 40 (see FIG. 1(d)), sometimes referred to as an anchor tag, has been manufactured by Floy Tag and Manufacturing, Inc. of Seattle, Wash. The model designation of tag 40 is Floy FD-68. As will be reviewed in further detail below, the improvement described herein relates to a modification of this general configuration of anchor tag, which modification provides substantially improved retentive capability.

As depicted in FIG. 2, tag 60 is inserted at the posterior base of soft dorsal fin 62 of a fish 64. The angle of insertion is approximately 45°. Preferably, the anchor end of the tag is locked behind the petrygiophores. Tag 60 includes a monofilament element 66 having a crosspiece 68 disposed at one end, which crosspiece serves as an anchor to provide a physical impediment against withdrawal of the tag. A sleeve 70, which may be a length of vinyl tubing that contains a printed message and identification number, is penetrably supported by element 66. To prevent sliding withdrawal of the sleeve, the posterior end of the element is formed with a bulbous end 72 after mounting of the sleeve. This bulbous end is of a size sufficient to prevent passage through the sleeve and the sleeve will thereby be retained upon the element. To the extent of the above description, fish tag 60 is essentially the same as the anchor tag 40 illustrated in FIG. 1(d).

The improvement relates to the deployment of a length of tubing 80 mounted upon element 66 intermediate crosspiece 68 and end 74 of sleeve 70. Tubing 80 is a length of fabric or material formed in a tubular configuration. Preferably, the material is of an inert substance and contains pores, holes or convolutions which accommodate or permit adherence with or penetration by growing tissue of the fish to be tagged. A material suitable for this purpose is manufactured by W. L. Gore and Associates, Inc. of Flagstaff, Ariz. This material is sold under the trademark GORE-TEX; it is sometimes referred to as expanded Teflon , a trademark of the Dupont Company.

As particularly illustrated in FIG. 5, material 82 of tubing 80 is an expanded microporous polytetrafluoroethylene (PTFE). A large plurality of nodes 84 are oriented perpendicularly to the direction which the expansion of the material was effected. These nodes, on the average about 50 microns in size and fairly irregular in shape, lie closely together and in many instances appear to touch at points. Each node 84 is connected to an adjacent or nearby node by a multiplicity of fibrils 86 which fibrils may vary in length from 5 to 500 microns, depending on the amount of expansion of material 82. These fibrils are thin, flexible and easily pushed aside by cellular growth into pores 88. Typically, the size of the pores in material 82, characterized by the fibril length, is in the range of 30 to 40 microns. The density of the material may be in the range of 0.24 g/ml. to 0.35 g/ml. Details of the process for producing and the characteristics of material 82 are described in U.S. Pat. No. 4,187,390, which details are incorporated herein by reference.

The tissue that grows into the pores is primarily composed of cells known as fibroblasts. These cells recreate collagen, which is an acellular connective tissue. Together, these form scar tissue. This cellular ingrowth in material 82, sometimes referred to as incorporation, has the effect of assimilating the material with the living tissue. The amount and extent of tissue ingrowth appears, according to one study, to be primarily a function of pore size rather than the thickness of material 82. Aside from expanded PTFE, it has been learned that material 82 may be woven or knitted dacron, polyester, polypropylene, etc. or a mesh formed therefrom. These and possible other useful inert materials may also permit adjacent cellular ingrowth that results in incorporation. A material 82, if of titanium, will permit adherence of the living tissue directly to the material. With appropriate configuration of the titanium, an ingrowth and incorporation can be effected.

Referring in particular to FIGS. 3 and 4, there is illustrated an implanted tag 60 with crosspiece 68 located sufficiently deeply within fish 64 to place tubing 80 in direct contact with the living tissues of the fish. As a result of experiments and other developmental work, it has been learned that within a matter of hours the initial processes of cellular ingrowth of connective tissue into material 82 of tubing 80 will occur. Such ingrowth will penetrate pores 88 between fibrils 86 and encapsulate at least some of the fibrils of tubing 80. The resulting bond between tubing 80 and the surrounding tissues will immobilize the tubing as the adjacent living tissues (cells) will not recede from the tubing. With the tubing immobilized, tag 60 is secured in place with a retentive force substantially greater than that provided by crosspiece 68. Furthermore, the vibration of tag 60, due to the trailing of element 66 and sleeve 70 through the water, will be severely damped by the flesh through the bond formed with tubing 80. This damping will reduce the mechanical irritation of the living tissue. With lessened vibration, rejection by the tissues of the foreign object represented by the anchor tag may be reduced to the extent that recession or atrophy of the tissue in immediate contact with the invasive and non assimilated portion of the tag may be drastically reduced. This process of incorporation is progressive with the passage of time so that the bonding of living tissue and tag becomes stronger. Long term studies of tagged fish become more practical as tag loss is severely limited or virtually eliminated.

Referring jointly to FIGS. 6 and 7, there is illustrated apparatus and a method for tagging fish. Magazine fed tagging gun 100 is commercially available for implanting monofilament T-bar tags used in the clothing industry which are much like a part of tags 40 and 60 (See FIGS. 1(d) and 3). Because tag 60 is structurally similar to tag 40 with respect to implantation within a fish, the gun may be used for implanting a magazine 102 of tags 60. Upon depressing trigger 104, crosspiece 68 will be loaded into hollow needle 106 and ejected therefrom. Upon simultaneous insertion of needle 106 into flesh 88 of fish 64, crosspiece 68 will be injected into the flesh. A segment of element 66 supporting tubing 80 and trailing from the crosspiece will also be injected. By appropriate positioning of tubing 80 in proximity to crosspiece 68, the tubing will become lodged within flesh 88. On release of trigger 104, hollow needle 106 is withdrawn to leave the crosspiece portion of tag 60 lodged within the fish. This method is well proven in the field and is easy to use despite cold weather and low temperatures. Instruction and training of tagging personnel is minimal while a high degree of accuracy in proper placement of the tag is present. Accordingly, the present invention is readily and effectively usable to tag fish under inclement conditions and by personnel who have had minimal training.

The junction between element 66 and crosspiece 68 is a high stress point which, in tags of the configuration depicted in FIG. 1(d) (tag 40), will fracture. Such fracture eliminates the anchoring effect of the crosspiece and the remaining part of the tag will pull out and become lost. However, by incorporating material 82 in tag 60 the stresses imposed upon the tag are partly resisted or absorbed by the living tissue through the bond between the material and cellular ingrowth or cellular adhesion. Accordingly, the likelihood of disengagement between the crosspiece and the element is reduced. It has also been learned that the need for crosspiece 68 or like anchor element may not always exist.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirement without departing from those principles.

I claim:

1. An invasive tag for tagging living specimens, said tag comprising in combination:
   (a) an anchor for initially anchoring said tag invasively to the specimen; and
   (b) invasively placed material comprising a part of said anchor and receptive to cellular ingrowth for developing a bond between the flesh of the tagged specimen and said tag, said bond being formed by cellular ingrowth; whereby, said material anchors said tag long term.

2. The tag as set forth in claim 1 wherein said material is receptive to cellular adhesion.

3. The tag as set forth in claim 1 wherein said material comprises expanded PTFE.

4. The tag as set forth in claim 3 wherein said expanded PTFE includes pores and wherein the size of said pores are in the range of 30–40 microns.

5. The tag as set forth in claim 1 wherein said material includes fibrils defining a plurality of pores for receiving cellular ingrowth.

6. The tag as set forth in claim 1 wherein said material comprises titanium.

7. The tag as set forth in claim 1 wherein said material comprises a fabric of man made fibers selected from the group of polyester, dacron and polypropylene.

8. The tag as set forth in claim 1 including an element extending from said anchor exterior of the specimen and wherein said material is secured to said element.

9. An invasive tag for tagging living specimens, said tag comprising in combination:
   (a) an anchor for initially anchoring said tag invasively to the specimen; and
   (b) a flexible shaft extending from said anchor exterior of the specimen;
   (c) invasively placed material receptive to adherence of cellular growth for developing a bond between the flesh of the tagged specimen and said tag, said material comprising a length of tubing disposed about said shaft;

whereby, said material anchors said tag long term.

10. The tag as set forth in claim 9 including means for retaining said length of tubing proximate said anchor.

11. A tag for tagging a living specimen, said tag comprising in combination:
    (a) means for initially invasively securing said tag to the specimen; and
    (b) material formed as part of said tag and disposed invasively in the specimen for adhering said tag long term as a result of cellular ingrowth of said material by the living tissue of the specimen.

12. The tag as set forth in claim 11 wherein said material comprises an inert material.

13. The tag as set forth in claim 11 wherein said material comprises expanded PTFE.

14. A method for tagging a living specimen with a tag, said method comprising the steps of:
    (a) invasively locating a mechanical anchor of the tag within the specimen; and
    (b) encouraging cellular adhesion to the anchor to form a long term bond between the flesh of the specimen and the tag.

15. The method as set forth in claim 14 wherein the anchor tag includes microporous material and said step of comprises the step of accommodating for cellular ingrowth into the pores of the material.

16. The method as set forth in claim 14 wherein the anchor includes material of expanded PTFE having fibrils interconnecting nodes and defining pores within the material and wherein said step of encouraging includes the step of accommodating the formation of scar tissue about the fibrils.

17. A method for tagging a living specimen with a tag, said method comprising the steps of:
    (a) invasively locating a mechanical anchor of the tag within the specimen;
    (b) bonding the tag to the specimen by invasively placing within the living specimen a material forming a part of the tag upon exercise of said step of locating and which material does not repel cellular ingrowth.

18. The method as set forth in claim 10 wherein the material is microporous and wherein said step of bonding comprises penetrating the pores of the material with cells of the living specimen.

19. A method for tagging a living specimen with a tag, said method comprising the steps of:
    (a) invasively locating a part of the tag; and
    (b) providing for cellular ingrowth of an invasively located segment of the tag with living tissue of the specimen.

20. A method for tagging a living specimen with a tag, said method comprising the steps of:
    (a) invasively locating a part of the tag; and
    (b) providing for cellular adhesion of an invasively located segment of the tag with living tissue of the specimen.

* * * * *